US012591665B2

(12) United States Patent
Singh et al.

(10) Patent No.: US 12,591,665 B2
(45) Date of Patent: Mar. 31, 2026

(54) SYSTEM AND METHOD FOR SECURING A VIRTUAL REALITY ENVIRONMENT

(71) Applicant: Bank of America Corporation, Charlotte, NC (US)

(72) Inventors: Shailendra Singh, Thane West (IN); Vinod Maghnani, Gurugram (IN); Sunil Bhashetty, Hyderabad (IN); Tulasi Nekkanti, Hyderabad (IN); Zakir Basha Shaik, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 218 days.

(21) Appl. No.: 18/451,273

(22) Filed: Aug. 17, 2023

(65) Prior Publication Data

US 2025/0061193 A1 Feb. 20, 2025

(51) Int. Cl.
| | |
|---|---|
| *G06F 21/55* | (2013.01) |
| *G06F 3/01* | (2006.01) |
| *G06F 21/62* | (2013.01) |
| *G06T 19/00* | (2011.01) |

(52) U.S. Cl.
CPC ............ *G06F 21/554* (2013.01); *G06F 3/011* (2013.01); *G06F 21/6218* (2013.01); *G06T 19/00* (2013.01); *G06F 2221/032* (2013.01); *G06T 2219/024* (2013.01)

(58) Field of Classification Search
CPC .... G06F 21/554; G06F 21/6218; G06F 3/011; G06T 19/00

USPC ......................................................... 726/23
See application file for complete search history.

(56) References Cited

U.S. PATENT DOCUMENTS

| | | | |
|---|---|---|---|
| 10,373,129 | B1 | 8/2019 | James et al. |
| 10,438,290 | B1 | 10/2019 | Winklevoss et al. |
| 10,540,653 | B1 | 1/2020 | James et al. |
| 10,540,654 | B1 | 1/2020 | James et al. |
| 10,915,891 | B1 | 2/2021 | Winklevoss et al. |
| 10,929,842 | B1 | 2/2021 | Arvanaghi et al. |
| 11,139,955 | B1 | 10/2021 | Auerbach et al. |
| 11,200,569 | B1 | 12/2021 | James et al. |
| 11,282,139 | B1 | 3/2022 | Winklevoss et al. |
| 11,308,487 | B1 | 4/2022 | Foster et al. |
| 11,334,883 | B1 | 5/2022 | Auerbach et al. |
| 11,443,059 | B2 | 9/2022 | Falchuk et al. |
| 11,475,442 | B1 | 10/2022 | James et al. |
| 11,615,205 | B2 | 3/2023 | Singh |

(Continued)

*Primary Examiner* — Zi Ye

(57) ABSTRACT

A method includes rendering on displays of a plurality of extended reality (XR) devices an XR environment. The XR environment includes a first user avatar authorized to interact with an XR application of the plurality of XR applications and a second user avatar unauthorized to interact with the XR application. The method includes receiving, by sensors of an XR device, sensor data indicative of a user intent to interact with the XR application by the second user avatar, generating, based on the sensor data, an estimation of an unauthorized interaction with the XR application by the second user avatar, executing, based on the estimation of the unauthorized interaction, a data obfuscation of information associated with an authorized interaction with the XR application by the first user avatar, and re-rendering on the displays of the plurality of XR devices the XR application in accordance with the executed data obfuscation.

17 Claims, 3 Drawing Sheets

(56)     References Cited

U.S. PATENT DOCUMENTS

| 12,101,361 | B1 * | 9/2024 | Pirnazar | ................ | H04L 65/403 |
| 2021/0089638 | A1 * | 3/2021 | Seiler | ...................... | G06F 3/017 |
| 2022/0172050 | A1 | 6/2022 | Dalli et al. | | |
| 2022/0248955 | A1 | 8/2022 | Tran | | |
| 2022/0405359 | A1 * | 12/2022 | Sharma | ............... | G06F 3/04815 |
| 2023/0222479 | A1 * | 7/2023 | Ene | ..................... | G06F 3/04815 |
| | | | | | 705/44 |

* cited by examiner

SYSTEM AND METHOD FOR SECURING A VIRTUAL REALITY ENVIRONMENT

TECHNICAL FIELD

The present disclosure relates generally to virtual reality environments, and, more specifically, to a system and method for securing a virtual reality environment.

BACKGROUND

Some institutions may provide applications suitable for extended reality (XR) environments (e.g., virtual-reality (VR) environments, augmented-reality (AR) environments, mixed-reality (MR) environments, and so forth), which may allow users to perform interactions in XR. As the number of users and associated user avatars interacting with such applications increases, effective methods for monitoring and controlling data privacy and security of user interactions in XR environments will become increasingly important. For example, as a user avatar navigates to a technology application or 3D object rendered within the XR environment, other user avatars may be within a proximity of the user avatar and may be viewing and/or interacting with the same technology application or 3D object. In some instances, as the user avatar begins performing an interaction, sensitive information (e.g., interaction information, personal identification information, and so forth) may be susceptible to becoming viewable and obtainable by other unauthorized user avatars within a proximity of the user avatar.

SUMMARY

The system and methods implemented by the system as disclosed in the present disclosure provide technical solutions to the technical problems discussed above by providing systems and methods for securing applications and user data within extended reality (XR) environments. The disclosed system and methods provide several practical applications and technical advantages.

The present embodiments are directed to systems and methods for securing applications and user information within XR environments. In particular embodiments, one or more processors may render on one or more displays of a number of XR devices executing the XR environment. For example, in one embodiment, the XR environment may include a number of user avatars configured to interact with the number of XR applications executing within the XR environment. In particular embodiments, the number of user avatars may include a first user avatar authorized to interact with an XR application of the number of XR applications and a second user avatar unauthorized to interact with the XR application.

In particular embodiments, the one or more processors may then receive, by one or more sensors of at least one of the number of XR devices, sensor data indicative of a user intent to interact with the XR application by the second user avatar. For example, in particular embodiments, the sensor data may include sensor data indicative of one or more of a head pose of a user corresponding to the second user avatar, an eye gaze of the user, a hand gesture of the user, a face of the user, or a body movement of the user. In particular embodiments, the sensor data may include sensor data indicative of one or more of a haptic control of a user corresponding to the second user avatar, a spatial proximity of the second user avatar with respect to one or more rendered objects associated with the XR application, or an object pose of the one or more rendered objects.

In particular embodiments, the one or more processors may then generate, based on the sensor data, an estimation of an unauthorized interaction with the XR application by the second user avatar. For example, in particular embodiments, the one or more processors may be configured to generate an interaction score as the estimation of the unauthorized interaction. For example, in particular embodiments, the interaction score may include a numerical value indicative of a likelihood of the unauthorized interaction with the XR application by the second user avatar. In particular embodiments, prior to generating the estimation of the unauthorized interaction, the one or more processors may be configured to weight the sensor data based on a device capability of the least one of the plurality of XR devices.

In particular embodiments, weighting the sensor data based on the device capability may include assigning a higher weight to eye-tracking or face tracking sensor data and a lower weight to head pose or object pose sensor data when the at least one of the number of XR devices includes eye-tracking and face-tracking capabilities. In particular embodiments, weighting the sensor data based on the device capability may include assigning a higher weight to head pose or object pose sensor data and a lower weight to other sensor data when the at least one of the number of XR devices does not include eye-tracking and face-tracking capabilities. In particular embodiments, the one or more processors may then generate the estimation of the unauthorized interaction based on the weighted sensor data.

In particular embodiments, the one or more processors may then execute, based on the estimation of the unauthorized interaction, a data obfuscation of information associated with an authorized interaction with the XR application by the first user avatar. For example, in particular embodiments, the one or more processors may be configured to execute the data obfuscation based on whether the estimation of the unauthorized interaction exceeds a predetermined threshold. For example, in particular embodiments, the one or more processors may be configured to execute the data obfuscation by executing one or more of a tokenization of the information associated with the authorized interaction with the XR application, a masking of the information associated with the authorized interaction with the XR application, or an encryption of the information associated with the authorized interaction with the XR application.

For example, the tokenization may include a substitution of at least a subset of the information with a different information. The masking may include a redaction of at least a subset of the information. The encryption may include an encoding of at least a subset of the information. In particular embodiments, the one or more processors may then re-render on the one or more displays of the number of XR devices the XR application in accordance with the executed data obfuscation.

The disclosed system and method provide the additional practical application of improving interoperability and security of extended reality (XR) systems (e.g., virtual reality (VR) systems, augmented reality (AR) systems, mixed (MR) systems, and so forth) so that information may be seamlessly and securely shared between these systems to implement data security, authorization and authentication of data interactions, access to an extended reality environment (e.g., metaverse environment, VR environment, AR environment, MR environment, or some combination thereof), access to entities within the extended reality environment and other data interactions performed in real-world and extended reality environments.

For example, user information or sensor data retrieved from a user and/or a user's device in a real-world environment may be used within the extended reality environment to determine whether to restrict or allow access to a particular XR application or one or more particular rendered objects associated with the particular XR application within the extended reality environment and/or to perform any kind of action or interaction with the particular XR application or the one or more particular rendered objects associated with the particular XR application.

Thus, the disclosed system and methods improve data security in extended reality environments. By improving data security in extended reality environments, the disclosed system and methods generally improve technology related to performing secure data interactions in extended reality environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
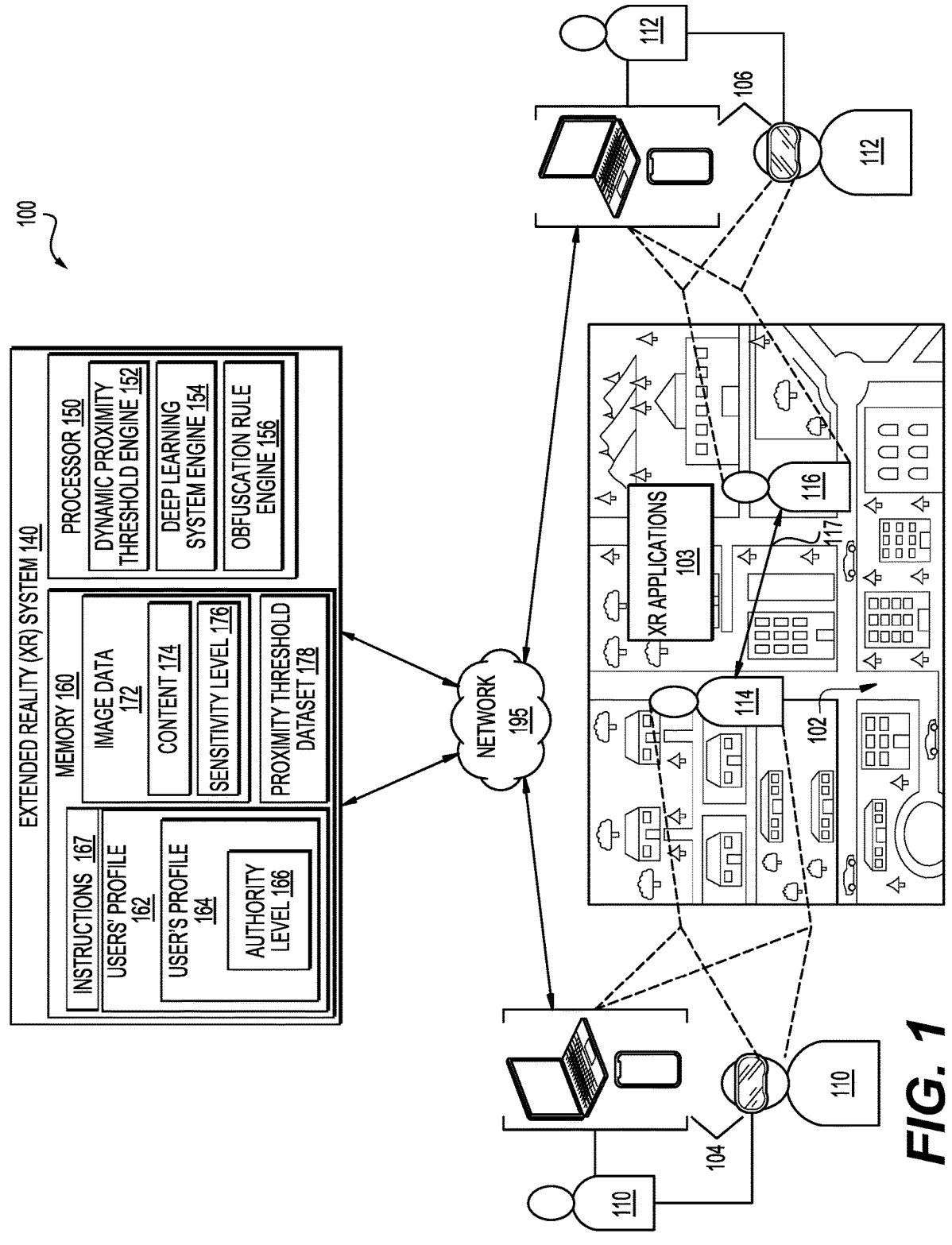
FIG. 1 is a block diagram of a system of an extended reality (XR) system and network, in accordance with certain aspects of the present disclosure.

FIG. 1 is a block diagram of an extended reality (XR) system and network 100, in accordance with certain aspects of the present disclosure. In particular embodiments, the system and network 100 may include a first XR device 104, a second XR device 106, real-world server 130, and a XR system 140, each connected to a network 195. A first user 110 is associated with the first XR device 104 and a second user 112 is associated with the second XR device 106. The system and network 100 may be communicatively coupled to the network 195 and may be operable to transmit data between each one of the first XR device 104, the second XR device 106, and the XR system 140 through the network 195.

In particular embodiments, the system and network 100 may improve interoperability and security of extended reality (XR) systems (e.g., virtual reality (VR) systems, augmented reality (AR) systems, mixed (MR) systems, and so forth) so that information may be seamlessly and securely shared between these systems to implement data security, authorization and authentication of data interactions, access to an extended reality environment 102 (e.g., metaverse environment, VR environment, AR environment, MR environment, or some combination thereof), access to entities within the extended reality environment 102 and other data interactions performed in real-world and extended reality environments. For example, user information or sensor data retrieved from a user and/or a user's XR device in a real-world environment may be used in the extended reality environment 102 to determine whether to restrict or allow access to a particular XR application 103 or one or more particular rendered objects associated with the particular XR application 103 within the extended reality environment 102 and/or to perform any kind of action or interaction with the particular XR application 103 or the one or more particular rendered objects associated with the particular XR application 103.

Additionally, or alternatively, user information collected from the first user 110 and/or assigned to the first user 110 in the real-world environment or extended reality environment 102 may be used in the extended reality environment 102 to provide the first user 110 access to products, services and/or experiences within the extended reality environment 102. This process provides improved information security because it authenticates that a first avatar 114 is associated with the first user 110, not an unauthorized party, and that the first user 110 is authorized to access the extended reality environment 102, obtain products, services and experiences within the extended reality environment 102 and perform data interactions. Further, a user may obtain a product, service or experience by transferring real-world data objects between real-world entities based on data interactions performed in the extended reality environment 102.

In particular embodiments, the first user 110 may access the extended reality environment 102 through the first XR device 104. The first XR device 104 is configured to display a two-dimensional (2D) or three-dimensional (3D) representation of the extended reality environment 102 to the first user 110. Examples of an extended reality environment 102 may include, but are not limited to, a graphical or virtual representation of a metaverse, a map, a building interior, a landscape, a fictional location, an alternate reality, or any other suitable type of location or environment. The extended reality environment 102 may be configured to use realistic or non-realistic physics for the motion of objects and allow the avatars 114, 116 to interact with one or more XR applications 103 within the extended reality environment 102. For example, some extended reality environments 102 may be configured to use gravity whereas other extended reality environments 102 may not be configured to use gravity. Within the extended reality environment 102, each user may be associated with an avatar (such as the first avatar 114 for the first user 110). An avatar is a graphical representation of a user at a virtual location within the extended reality environment 102.

In particular embodiments, the virtual location of each avatar 114, 116 may be correlated to the physical location of each respective user 110, 112 in the real-world environment. Examples of avatars 114, 116 may include, but are not limited to, a person, an animal, or an object. In some embodiments, the features and characteristics of the avatars 114, 116 may be customizable, and user defined. For example, the size, shape, color, attire, accessories, or any other suitable type of appearance features may be specified by a user. By using the avatars 114, 116, the respective users 110, 112 may be able to move within the extended reality environment 102 to interact with one or more avatars and objects within the extended reality environment 102 while independently remaining at a physical location in the real-world environment or being in transit in the real-world environment.

While engaging in the extended reality environment 102 via the first avatar 114, the first user 110 may interact with a number of other users, objects and/or entities through a respective avatar. For example, the second user 112 may attempt to engage in an interaction session with the first avatar 114 through a second avatar 116 associated with the second user 112. In another example, the first avatar 114 of the first user 110 may access an extended reality sub-environment (not shown) within the extended reality environment 102 and perform virtual data interactions within the virtual sub-environment. In the real-world environment, the second user 112 may be physically located at a distance away from the first user 110. The second user 112 may access the extended reality environment 102 through the second XR device 106 to control the second avatar 116 and attempt to engage in an interaction session with the first user 110 through the first avatar 114.

Before the interaction between the first avatar 114 and the second avatar 116 occurs, the XR system 140 may authenticate that the first avatar 114 is associated with the first user 110 and not an unauthorized third-party. For example, the first user 110 may be required to sign into a secure portal that provides access to a data file associated with the first user 110. In some examples, a real-world data file of the first user 110 and a first virtual data file of the first user 110 may be stored and managed by the XR system 140. Similarly, a second virtual data file associated with the second user 112 is managed by the XR system 140.

In particular embodiments, the XR system 140 may store other information related to the first user 110 including, but not limited to, users' profile 162, account information (e.g., including identity and other details relating to users 110, 112), avatar information, digital assets information, or any other suitable type of information that is associated with a user within the extended reality environment 102 and/or the real-world environment. As depicted in FIG. 1, the XR system 140 may include a processor 150 and a memory 160. The processor 150 may include one or more processors operably coupled to the memory 160. In some embodiments, the processor 150 may be any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). In other embodiments, the processor 150 may be a programmable logic device, a microcontroller, a microprocessor, or any suitable combination of the preceding.

In particular embodiments, the processor 150 is communicatively coupled to and in signal communication with the memory 160. The processor 150 may be configured to process data and may be implemented in hardware or software. For example, the processor 150 may be 8-bit, 16-bit, 32-bit, 64-bit or of any other suitable architecture. The processor 150 may include an arithmetic logic unit (ALU) for performing arithmetic and logic operations, processor registers that supply operands to the ALU and store the results of ALU operations, and a control unit that fetches instructions 167 from memory 160 and executes them by directing the coordinated operations of the ALU, registers and other components.

In particular embodiments, the processor 150 may be configured to implement various instructions 167. For example, the processor 150 may be configured to execute the instructions 167 to implement the XR system 140. In this way, processor 150 may be a special-purpose computer designed to implement the functions disclosed herein. In particular embodiments, the XR system 140 is implemented using logic units, FPGAs, ASICs, DSPs, or any other suitable hardware. The XR system 140 is configured to operate as described below with reference to FIGS. 2 and 3. For example, the processor 150 may be configured to perform at least a portion of the method 300 as described in FIG. 3. In particular embodiments, as will be discussed in greater detail below, the processor 150 may include dynamic proximity threshold engine 152, a deep learning system engine 154, and an obfuscation rule engine 156.

In particular embodiments, the memory 160 may include one or more disks, tape drives, or solid-state drives, and may be used as an over-flow data storage device, to store programs when such programs are selected for execution, and to store instructions 167 and data that are read during program execution. The memory 160 may be volatile or non-volatile and may comprise a read-only memory (ROM), random-access memory (RAM), ternary content-addressable memory (TCAM), dynamic random-access memory (DRAM), and static random-access memory (SRAM). In particular embodiments, the memory 160 is operable to store users' profiles 162, a first user's profile 164, an authority level 166, image data 172, content 174, a sensitivity level 176, and a proximity threshold dataset 178. In particular embodiments, the image data 172 may include any pixel data or voxel data that may be utilized to render and display the extended reality environment 102 (including XR application 103 and avatars 114, 116) onto respective displays of the XR devices 104 and 106 of the first user 110 and the second user 112, respectively.

In particular embodiments, network 195 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system and network 100. In other embodiments, system and network 100 may not have all of these components and/or may have other elements instead of, or in addition to, those above.

While the present embodiments may be discussed herein primarily with respect to XR devices 104, 106 being suitable for rendering and displaying the extended reality environment 102 (including XR application 103 and avatars 114, 116), it should be appreciated that the XR devices 104, 106 may be any user computing devices configured to communicate with other devices, such as a server (e.g., XR system 140), databases, etc. through the network 195. Each of the user devices may be configured to perform specific functions described herein and interact with the XR system 140, e.g., via respective user interfaces. Each of the XR devices 104, 106 is a hardware device that is generally configured to provide hardware and software resources to the first user 110 and the second user 112, respectively.

Examples of the XR devices 104, 106 include, but are not limited to, a VR device, an AR device, an MR device, a laptop, a computer, a smartphone, a tablet, a smart device, an Internet-of-Things (IoT) device, or any other suitable type of device. In particular embodiments, the XR devices 104, 106 may each include one or more displays, a touchscreen, a touchpad, keys, buttons, a mouse, or any other suitable type of hardware that allows the respective users 110, 112 to view data and/or to provide inputs into the XR devices 104, 106. In particular embodiments, the XR devices 104, 106 may also each include any number of sensors suitable for detecting and tracking sensor data (e.g., telemetry data) associated with one or more of the XR devices 104, 106, the users 110, 112, the avatars 114, 116, and/or the XR application 103.

For example, in particular embodiments, the number of sensors may include one or more of inertial measurement units (IMUs), one or more monochromatic cameras, one or more visible-light cameras (VLCs), one or more infrared (IR) cameras, one or more depth cameras, one or more accelerometers, one or more magnetometers, one or more gyroscopes, or other sensors that may be suitable for detecting and tracking a head pose of the respective users 110, 112, an eye gaze of the respective users 110, 112, a hand gesture of the respective users 110, 112, a face of the respective users 110, 112, a body movement of the respective users 110, 112, a haptic control of the respective users 110, 112, a spatial proximity of the avatars 114, 116 with respect to one or more rendered objects associated with the XR application 103, an object pose of one or more rendered objects associated with the XR application 103.

In particular embodiments, as previously noted, the processor 150 may include the dynamic proximity threshold engine 152. The dynamic proximity threshold engine 152 may be configured to determine a dynamic proximity threshold 117 of content 174 containing sensitive information based upon one or more interactions by the second user 112 or the second user avatar 116, a virtual location of the content 174, and/or sensitivity level 176 of the content 174. The dynamic proximity threshold 117 for the content 174 containing sensitive information is a distance from the XR device 106 and/or second user avatar 116 from which the content 174 is identifiable. In one embodiment, the dynamic proximity threshold engine 152 determines the dynamic proximity thresholds 117 of each content 174 containing sensitive information using a proximity threshold dataset 178 that includes distances at which a person with a reasonable eyesight is able to identify content 174.

In particular embodiments, the proximity threshold dataset 178 may also include tables for different content 174, different item sensitivity levels 176, different XR device 106 and/or second user avatar 116 virtual locations, and/or the like. For example, a first table may include distances from XR device 106 and/or second user avatar 116, from which the same image with different virtual locations is identifiable. A second table may include distances from XR device 106 and/or second user avatar 116, from which the same text with different font virtual locations is identifiable. A third table may include distances from XR device 106 and/or second user avatar 116, from which the same image with the same virtual location but different resolutions is identifiable. A fourth table may include distances from the XR device 106 and/or second user avatar 116 with different virtual locations, from which the same image is identifiable. Then, based on these data points, the dynamic proximity threshold engine 152 may determine a proximity threshold 117 for content 174 that has the same or closest data point to a particular datapoint.

In particular embodiments, as further previously noted, the processor 150 may also include the deep learning system engine 154. The deep learning system engine 154 may be configured to identify the users 110, 112 using any suitable face-tracking algorithm, eye-tracking algorithm, gesture recognition algorithm, and so forth. In one embodiment, the deep learning system engine 154 identifies the users 110, 112 by searching for each users' 110 image in the user profile 162 in memory 160, and for each of the users 110, 112, matching users' 110, 112 image to one of the stored user's profiles 164. The users' profile 162 in memory 160 includes users' authority level 166 that indicates which content 174 containing sensitive information, the user 110, 112 are authorized to view. For example, a first viewer among users 110, 112 with a low authority level 166 is authorized to view content 174 with a low sensitivity level 176. A second viewer among users 110, 112 with a high authority level 166 is authorized to view content 174 with low to high sensitivity levels 176. The authority level 166 of each of the users 110, 112 may be stored in their respective user's profile 164. Once the deep learning system engine 154 determines the identity of users 110, 112, the deep learning system engine 154 searches the users' profile 162 and matches the users 110, 112 image to one of the user's profiles 164.

In particular embodiments, as further previously noted, the processor 150 may also include the obfuscation rule engine 156. The obfuscation rule engine 156 may be configured to receive the dynamic proximity thresholds 117 of content 174 containing sensitive information from the dynamic proximity threshold engine 152, information regarding whether each of the users 110, 112 in the visual field of interest is authorized to view each of the content 174 containing sensitive information from the deep learning system engine 154, and the distance of each of the users 110, 112 from the image capturing engine 124 via network 170. Then, based on this received information, the obfuscation rule engine 156 may configured to dynamically obfuscate (e.g., tokenize, mask, and/or encrypt) a content 174 containing sensitive information if at least one viewer among users 110, 112 is at distance that is within a dynamic proximity threshold 117 of content 174 containing sensitive information and that viewer is not authorized to view the content 174.

In particular embodiments, the obfuscation rule engine 156 may obfuscate (e.g., tokenize, mask, and/or encrypt) the content 174 containing sensitive information with different methods and rules. In some examples, the obfuscation rule engine 156 may mask at least a portion of the content 174 containing sensitive information with a string of "XXX". In other examples, the obfuscation rule engine 156 may tokenize the content 174 containing sensitive information by substituting the content 174 containing sensitive information with another content that the users 110, 112 are authorized to view. In some examples, the obfuscation rule engine 156 may vary the content 174 containing sensitive information by a numeric variance applied to the content 174, so as to still show a meaningful range of data set, but not the actual data set containing sensitive information. For example, in one non-limiting example, masking sensitive information, such as personal identification information, the obfuscation rule engine 156 may utilize a +/−10% variance to the personal identification information, such that it still shows a meaningful and relevant range in the personal identification information without displaying the actual personal identification information.

In other examples, the obfuscation rule engine 156 may use an encryption method with a key to obfuscate the content 174 containing sensitive information. For example, one or more of the users 110, 112 authorized to view the content 174 containing sensitive information may use the key to decrypt or unmask the content 174. The key may be a password that is set by one or more of the users 110, 112 or an administrator of the sensitive information stored as part of image data 172. For example, the obfuscation rule engine 156 may obfuscate the content 174 containing sensitive information by displaying "encrypted item-1" instead of the actual content 174. When one or more of the users 110, 112 clicks on the content 174, the encryption method may pop up a window box asking for a key to decrypt the masked content 174. If the one or more of the users 110, 112 input the key for this content 174 correctly, the original content 174 may be displayed. In another example, the obfuscation rule engine 156 may delete the content 174 containing sensitive information from displaying.

In other examples, the obfuscation rule engine 156 may block at least a portion of the content 174 containing sensitive information with a filled shape. In some examples, the obfuscation rule engine 156 may modify a background of the content 174 containing sensitive information in addition to deleting the content 174. In some examples, the obfuscation rule engine 156 may reduce the size of the content 174 containing sensitive information until the selected content 174 is not identifiable to one or more of the users 110, 112 unauthorized to view the content 174. In some examples, the obfuscation rule engine 156 may blur at least a portion of the content 174.

Securing Applications and User Data within Extended Reality Environments

Embodiments of the present disclosure discuss techniques for securing applications and sensitive user data within extended reality environments.

Figure 2:
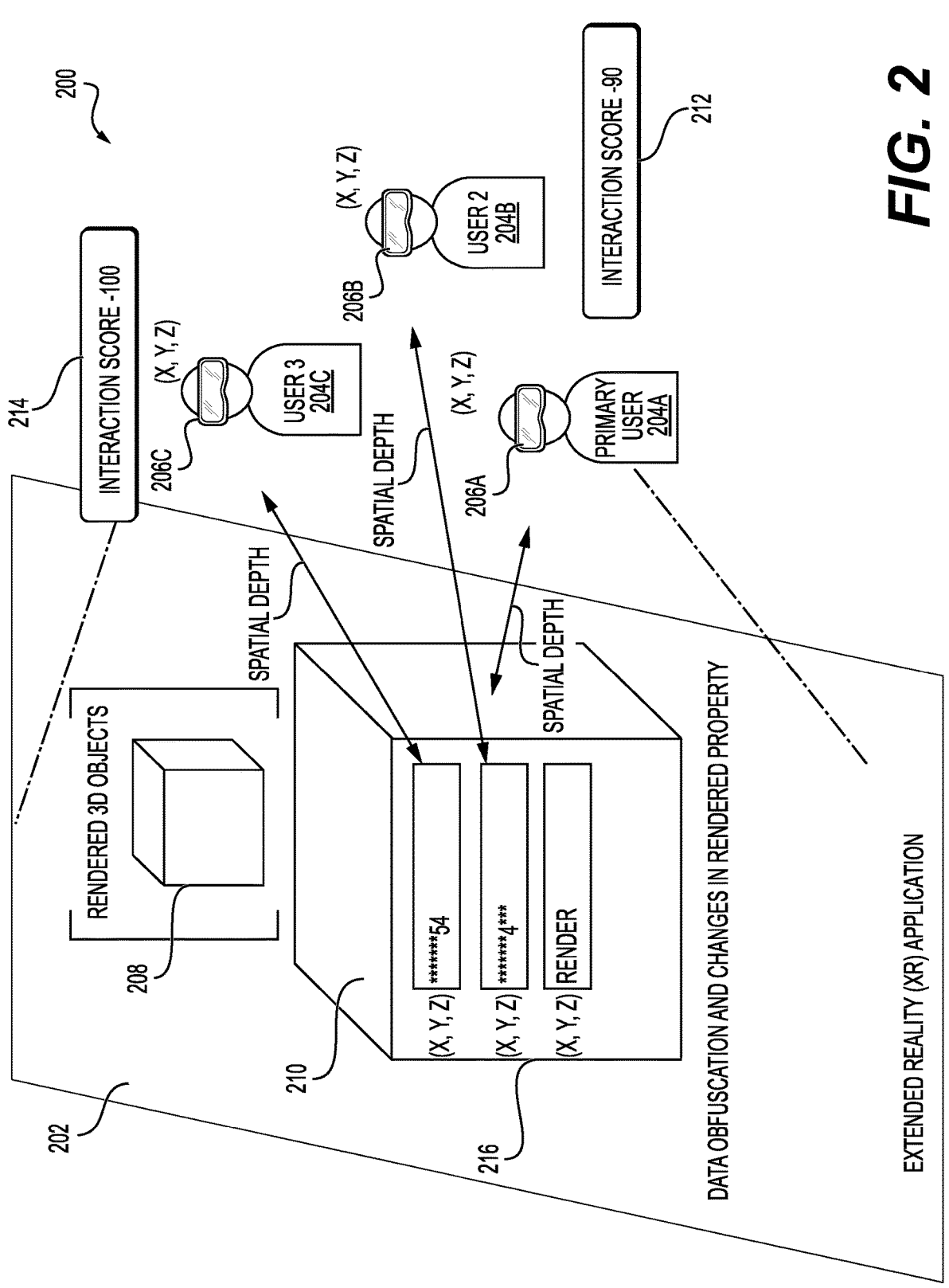
FIG. 2 is a block diagram of an embodiment of an extended reality (XR) environment for securing applications and sensitive user data within extended reality environments, in accordance with certain aspects of the present disclosure.

FIG. 2 is a block diagram of an embodiment of an extended reality (XR) environment 200 for securing applications and sensitive user data within extended reality environments, in accordance with certain aspects of the present disclosure. As depicted, the XR environment 200 may include a particular XR application 202 executing within the XR environment 200 and a number of users 204A (e.g., "Primary User"), 204B (e.g., "User 2"), and 204C (e.g., "User 3") each wearing a respective XR device 206A, 206B, and 206C. In particular embodiments, the XR environment 200 may include, for example, a virtual reality (VR) environment, an augmented reality (AR) environment, a mixed reality environment (MR) environment, or some combination thereof. In particular embodiments, the XR devices 206A, 206B, and 206C may be suitable for allowing the number of users 204A (e.g., "Primary User"), 204B (e.g., "User 2"), and 204C (e.g., "User 3") to interact within the XR environment 200 via respective avatars.

In particular embodiments, as further depicted by the XR environment 200, the user 204A (e.g., "Primary User") may be authorized to interact with the particular XR application 202 and the users 204B (e.g., "User 2") and 204C (e.g., "User 3) may be unauthorized to interact with the particular XR application 202. For example, in particular embodiments, the particular XR application 202 may include any extended reality application in which the user 204A (e.g., "Primary User") may interact with one or more rendered objects 208 that prompts the user 204A (e.g., "Primary User") to exchange sensitive information 210 (e.g., confidential interaction information, personal identification information, and so forth).

In particular embodiments, in accordance with the presently disclosed embodiments, the XR system 140 may receive sensor data indicative of an intent of the user 204B (e.g., "User 2") or the user 204C (e.g., "User 3) to interact with particular XR application 202. For example, in particular embodiments, one or more of the XR devices 206B and 206C may include any number of sensors that may be suitable for detecting and tracking one or more of a head pose of the users 204B (e.g., "User 2") and 204C (e.g., "User 3), an eye gaze of the users 204B (e.g., "User 2") and 204C (e.g., "User 3), a hand gesture of the users 204B (e.g., "User 2") and 204C (e.g., "User 3), a face of the user, or a body movement of the users 204B (e.g., "User 2") and 204C (e.g., "User 3), a haptic control of the users 204B (e.g., "User 2") and 204C (e.g., "User 3), a spatial proximity of their user avatars with respect to the one or more rendered objects 208, or an object pose of the one or more rendered objects 208.

In particular embodiments, upon receiving sensor data from one or more of the XR devices 206B and 206C, the XR system 140 may weight the sensor data based on a confidence of how suitable the sensor data is for determining user intent. For example, in some embodiments, the XR system 140 may assign a higher weight to eye-tracking or face tracking sensor data and a lower weight to head pose or object pose sensor data when at least one of the XR devices 206B and 206C includes eye-tracking and face-tracking capabilities. In other embodiments, the XR system 140 may assign a higher weight to head pose or object pose sensor data and a lower weight to other sensor data when the at least one of the XR devices 206B and 206C does not include eye-tracking and face-tracking capabilities.

In particular embodiments, as further depicted by the XR environment 200 of FIG. 2, based on the sensor data, the XR system 140 may then generate an estimation of an unauthorized interaction with the particular XR application 202 by the user 204B (e.g., "User 2") or the user 204C (e.g., "User 3). For example, in particular embodiments, the XR system 140 may generate the estimation of the unauthorized interaction by generating an interaction score 212 (e.g., "90") for the user 204B (e.g., "User 2") and an interaction score 214 (e.g., "100") for the user 204C (e.g., "User 3"). For example, in particular embodiments, the interaction scores 212 and 214 may each include, for example, a numerical value (e.g., ranging from "0" to "100") indicative of a likelihood of an unauthorized interaction with the particular XR application 202 by the user 204B (e.g., "User 2") and the user 204C (e.g., "User 3), respectively.

In particular embodiments, upon generating the interaction score 212 (e.g., "90") and the interaction score 214 (e.g., "100"), the XR system 140 may evaluate the interaction scores 212 and 214 by determining whether the interaction scores 212 and 214 each satisfies a predetermined threshold. For example, in particular embodiments, the predetermined threshold may correspond to an interaction score above or below a certain value (e.g., above or below a score of "20", above or below a score of "30", above or below a score of "40", above or below a score of "50", above or below a score of "60", above or below a score of "70", above or below a score of "80", and so forth) indicating either a high or low likelihood of an unauthorized interaction with the particular XR application 202 by the user 204B (e.g., "User 2") or the user 204C (e.g., "User 3).

In particular embodiments, upon determining that one or more of the interaction scores 212 and 214 satisfies the predetermined threshold, the XR system 140 may then execute, based on the estimation of the unauthorized interaction, a data obfuscation 216 of the sensitive information 210 associated with an authorized interaction with the particular XR application 202 by the user 204A (e.g., "Primary User"). For example, as further depicted by the XR environment 200 of FIG. 2, the XR system 140 may execute the data obfuscation 216 by executing one or more data tokenizations, data maskings, or data encryptions of the sensitive information 210 associated with the authorized interaction with the particular XR application 202.

In this way, the present embodiments may secure and obfuscate sensitive information 210 from other user avatars that may be within a proximity of the user 204A (e.g., "Primary User") avatar and that may be viewing and/or interacting with the same particular XR application 202. Indeed, as the user 204A (e.g., "Primary User") avatar begins performing an interaction, sensitive information 210 (e.g., confidential interaction information, personal identification information, and so forth) may be obfuscated, such that the sensitive information 210 is rendered unviewable, unobtainable, or otherwise indecipherable by unauthorized users 204B (e.g., "User 2") and 204C (e.g., "User 3).

Figure 3:
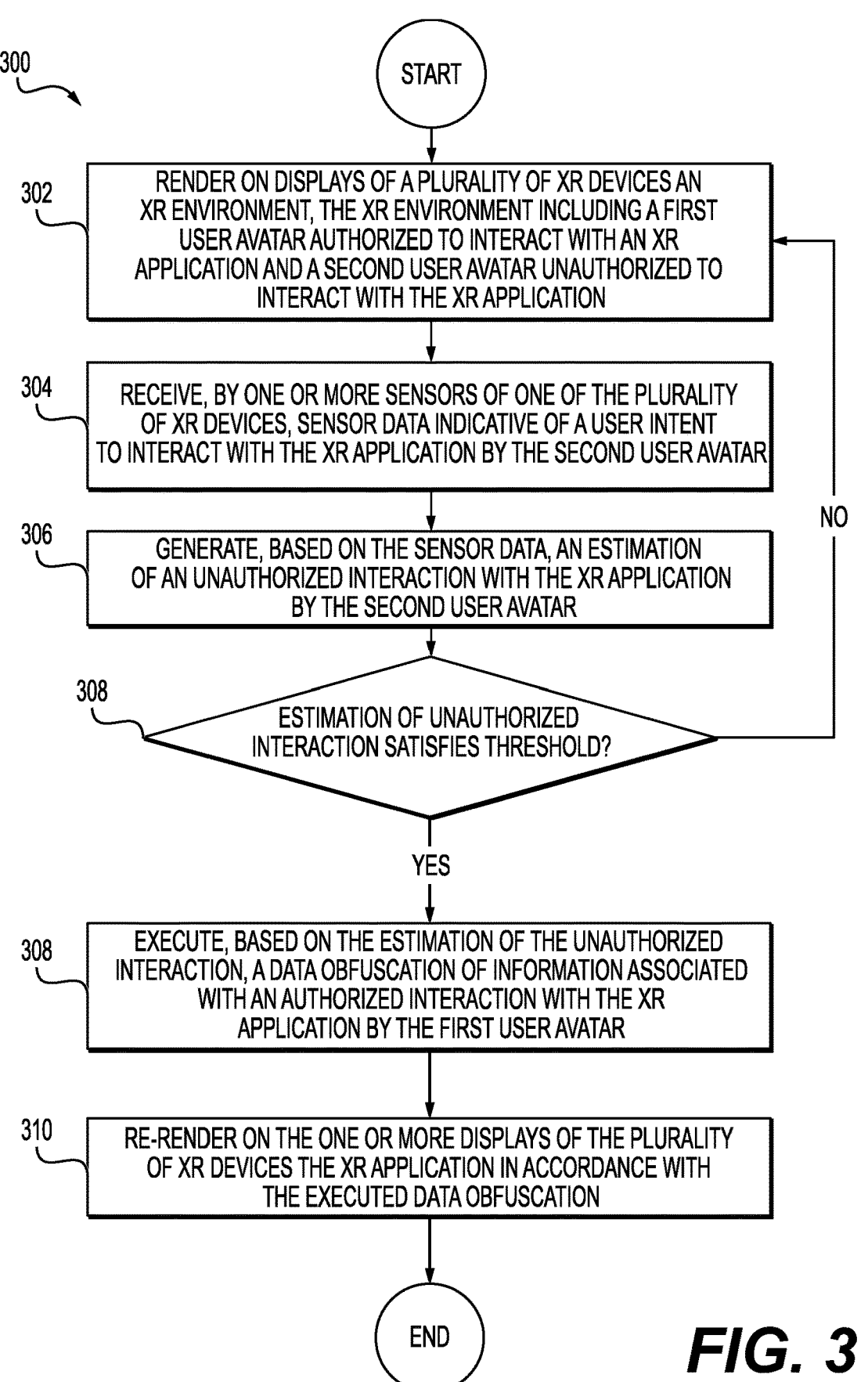
FIG. 3 illustrates a flowchart of an example method for securing applications and sensitive user data within extended reality environments, in accordance with one or more embodiments of the present disclosure.

FIG. 3 illustrates a flowchart of an example method 300 for securing applications and user data within extended reality environments, in accordance with one or more embodiments of the present disclosure. The method 300 may be performed by the system and network 100 as described above with respect to FIG. 1. The method 300 may begin at block 302 with the XR system 140 rendering on one or more displays of a number of XR devices 104, 106 an extended reality environment 102. In particular embodiments, the extended reality environment 102 may include a number of user avatars 114, 116 configured to interact with one or more XR applications 103 executing within the extended reality environment 102. In particular embodiments, the number of user avatars 114, 116 may include a first user avatar 114 authorized to interact with a particular XR application 202 and a second user avatar 116 unauthorized to interact with the particular XR application 202.

In particular embodiments, the method 300 may continue at block 304 with the XR system 140 receiving, by one or more sensors of at least one of the number of XR devices 104, 106, sensor data indicative of a user intent to interact with particular XR application 202 by the second user avatar 116. In some embodiments, the sensor data may include, for example, sensor data indicative of one or more of a head pose of the user 204B corresponding to the second user avatar 116, an eye gaze of the user 204B corresponding to the second user avatar 116, a hand gesture of the user 204B corresponding to the second user avatar 116, a face of the user 204B corresponding to the second user avatar 116, or a body movement of the user 204B corresponding to the second user avatar 116. In other embodiments, the sensor data may include, for example, sensor data indicative of one or more of a haptic control of the user 204B corresponding to the second user avatar 116, a spatial proximity of the second user avatar 116 with respect to one or more rendered objects 208 associated with the particular XR application 202, or an object pose of the one or more rendered objects 208.

In particular embodiments, the method 300 may continue at block 306 with the XR system 140 generating, based on the sensor data, an estimation of an unauthorized interaction with the particular XR application 202 by the second user avatar 116. For example, in particular embodiments, generating the estimation of the unauthorized interaction may include generating an interaction score 212. In particular embodiments, the interaction score 212 may include, for example, a numerical value (e.g., ranging from "0" to "100") indicative of a likelihood of an unauthorized interaction with the particular XR application 202 by the second user avatar 116.

In particular embodiments, the method 300 may continue at decision 308 with the XR system 140 determining whether the estimation of the unauthorized interaction satisfies a predetermined threshold. For example, in particular embodiments, the predetermined threshold may correspond to an interaction score 212 above or below a certain value (e.g., above or below a score of "20", above or below a score of "30", above or below a score of "40", above or below a score of "50", above or below a score of "60", above or below a score of "70", above or below a score of "80", and so forth) indicating either a high or low likelihood of an unauthorized interaction with the particular XR application 202 by the second user avatar 116.

In particular embodiments, in response to determining that the estimation of the unauthorized interaction does not satisfy the predetermined threshold (e.g., at decision 308), method 300 may return to block 302. In particular embodiments, in response to determining that the estimation of the unauthorized interaction satisfies the predetermined threshold (e.g., at decision 308), method 300 may continue at block 310 with the XR system 140 executing, based on the estimation of the unauthorized interaction, a data obfuscation 216 of sensitive information 210 associated with an authorized interaction with the particular XR application 202 by the first user avatar 114.

For example, in one embodiment, the XR system 140 may execute the data obfuscation 216 by executing one or more data tokenizations of the sensitive information 210 associated with the authorized interaction with the particular XR application 202. For example, the tokenization may include a substitution of at least a subset of the sensitive information 210 with a different information. In another embodiment, the XR system 140 may execute the data obfuscation 216 by executing one or more data maskings of the information 210 associated with the authorized interaction with the particular XR application 202. For example, the masking may include a redaction of at least a subset of the sensitive information 210. Still, in another embodiment, the XR system 140 may execute the data obfuscation 216 by executing one or more data encryptions of the sensitive information 210 associated with the authorized interaction with the particular XR application 202. For example, the encryption may include an encoding of at least a subset of the sensitive information 210.

In this way, the present embodiments may secure and obfuscate sensitive information 210 from other user avatars that may be within a proximity of the user 204A (e.g., "Primary User") avatar and that may be viewing and/or interacting with the same particular XR application 202. Indeed, as the user 204A (e.g., "Primary User") avatar begins performing an interaction, sensitive information 210 (e.g., confidential interaction information, personal identification information, and so forth) may be obfuscated, such that the sensitive information 210 is rendered unviewable, unobtainable, or otherwise indecipherable by unauthorized users 204B (e.g., "User 2") and 204C (e.g., "User 3).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory configured to store image data for rendering an extended reality (XR) environment on a plurality of XR devices and a plurality of XR applications executable within the XR environment; and
one or more processors operably coupled to the memory and configured to:
render on one or more displays of the plurality of XR devices the XR environment, wherein the XR environment comprises a plurality of user avatars configured to interact with the plurality of XR applications executing within the XR environment, and wherein the plurality of user avatars comprises a first user avatar authorized to interact with an XR application of the plurality of XR applications and a second user avatar unauthorized to interact with the XR application;
receive, by one or more sensors of at least one of the plurality of XR devices, sensor data indicative of a user intent to interact with the XR application by the second user avatar;
generate, based on the sensor data, an estimation of an unauthorized interaction with the XR application by the second user avatar;
execute, based on the estimation of the unauthorized interaction, a data obfuscation of information associated with an authorized interaction with the XR application by the first user avatar;
re-render on the one or more displays of the plurality of XR devices the XR application in accordance with the executed data obfuscation;
prior to generating the estimation of the unauthorized interaction, weight the sensor data based on a device capability of the least one of the plurality of XR devices, wherein weighting the sensor data based on the device capability comprises: 1) assigning a higher weight to eye-tracking or face tracking sensor data and a lower weight to head pose or object pose sensor data when the at least one of the plurality of XR devices includes eye-tracking and face-tracking capabilities, and 2) assigning a higher weight to head pose or object pose sensor data and a lower weight to other sensor data when the at least one of the plurality of XR devices does not include eye-tracking and face-tracking capabilities; and
generate the estimation of the unauthorized interaction based on the weighted sensor data.

2. The system of claim 1, wherein the sensor data comprises sensor data indicative of one or more of a head pose of a user corresponding to the second user avatar, an eye gaze of the user, a hand gesture of the user, a face of the user, or a body movement of the user.

3. The system of claim 1, wherein the sensor data comprises sensor data indicative of one or more of a haptic control of a user corresponding to the second user avatar, a spatial proximity of the second user avatar with respect to one or more rendered objects associated with the XR application, or an object pose of the one or more rendered objects.

4. The system of claim 1, wherein the one or more processors are configured to generate an interaction score as the estimation of the unauthorized interaction, and wherein the interaction score comprises a numerical value indicative of a likelihood of the unauthorized interaction with the XR application by the second user avatar.

5. The system of claim 1, wherein the one or more processors are configured to execute the data obfuscation based on whether the estimation of the unauthorized interaction exceeds a predetermined threshold.

6. The system of claim 1, wherein the one or more processors are configured to execute the data obfuscation by executing one or more of:
a tokenization of the information associated with the authorized interaction with the XR application, wherein the tokenization comprises a substitution of at least a subset of the information with a different information;
a masking of the information associated with the authorized interaction with the XR application, wherein the masking comprises a redaction of at least a subset of the information; or
an encryption of the information associated with the authorized interaction with the XR application, wherein the encryption comprises an encoding of at least a subset of the information.

7. A method, comprising:
rendering on one or more displays of a plurality of extended reality (XR) devices executing an XR environment, wherein the XR environment comprises a plurality of user avatars configured to interact with a plurality of XR applications executing within the XR environment, and wherein the plurality of user avatars comprises a first user avatar authorized to interact with an XR application of the plurality of XR applications and a second user avatar unauthorized to interact with the XR application;
receiving, by one or more sensors of at least one of the plurality of XR devices, sensor data indicative of a user intent to interact with the XR application by the second user avatar;
generating, based on the sensor data, an estimation of an unauthorized interaction with the XR application by the second user avatar;
executing, based on the estimation of the unauthorized interaction, a data obfuscation of information associated with an authorized interaction with the XR application by the first user avatar;
re-rendering on the one or more displays of the plurality of XR devices the XR application in accordance with the executed data obfuscation;
prior to generating the estimation of the unauthorized interaction, weighting the sensor data based on a device capability of each of the plurality of XR devices, wherein weighting the sensor data based on the device capability comprises: 1) assigning a higher weight to eye-tracking or face tracking sensor data and a lower weight to head pose or object pose sensor data when the at least one of the plurality of XR devices includes eye-tracking and face-tracking capabilities, and 2) assigning a higher weight to head pose or object pose sensor data and a lower weight to other sensor data when the at least one of the plurality of XR devices does not include eye-tracking and face-tracking capabilities; and generating the estimation of the unauthorized interaction based on the weighted sensor data.

8. The method of claim 7, wherein the sensor data comprises sensor data indicative of one or more of a head pose of a user corresponding to the second user avatar, an eye gaze of the user, a hand gesture of the user, a face of the user, or a body movement of the user.

9. The method of claim 7, wherein the sensor data comprises sensor data indicative of one or more of a haptic control of a user corresponding to the second user avatar, a spatial proximity of the second user avatar with respect to one or more rendered objects associated with the XR application, or an object pose of the one or more rendered objects.

10. The method of claim 7, wherein generating the estimation of the unauthorized interaction comprises generating an interaction score, wherein the interaction score comprises a numerical value indicative of a likelihood of the unauthorized interaction with the XR application by the second user avatar.

11. The method of claim 7, further comprising executing the data obfuscation based on whether the estimation of the unauthorized interaction exceeds a predetermined threshold.

12. The method of claim 7, wherein executing the data obfuscation comprises executing one or more of:

a tokenization of the information associated with the authorized interaction with the XR application, wherein the tokenization comprises a substitution of at least a subset of the information with a different information;

a masking of the information associated with the authorized interaction with the XR application, wherein the masking comprises a redaction of at least a subset of the information; or an encryption of the information associated with the authorized interaction with the XR application, wherein the encryption comprises an encoding of at least a subset of the information.

13. A non-transitory computer-readable medium storing instructions that, when executed by one or more processors, cause the one or more processors to:

render on one or more displays of a plurality of XR devices an XR environment, wherein the XR environment comprises a plurality of user avatars configured to interact with the plurality of XR applications executing within the XR environment, and wherein the plurality of user avatars comprises a first user avatar authorized to interact with an XR application of the plurality of XR applications and a second user avatar unauthorized to interact with the XR application;

receive, by one or more sensors of at least one of the plurality of XR devices, sensor data indicative of a user intent to interact with the XR application by the second user avatar;

generate, based on the sensor data, an estimation of an unauthorized interaction with the XR application by the second user avatar;

execute, based on the estimation of the unauthorized interaction, a data obfuscation of information associated with an authorized interaction with the XR application by the first user avatar;

re-render on the one or more displays of the plurality of XR devices the XR application in accordance with the executed data obfuscation;

prior to generating the estimation of the unauthorized interaction, weight the sensor data based on a device capability of the least one of the plurality of XR devices, wherein weighting the sensor data based on the device capability comprises: 1) assigning a higher weight to eye-tracking or face tracking sensor data and a lower weight to head pose or object pose sensor data when the at least one of the plurality of XR devices includes eye-tracking and face-tracking capabilities, and 2) assigning a higher weight to head pose or object pose sensor data and a lower weight to other sensor data when the at least one of the plurality of XR devices does not include eye-tracking and face-tracking capabilities; and generate the estimation of the unauthorized interaction based on the weighted sensor data.

14. The non-transitory computer-readable medium of claim 13, wherein the sensor data comprises sensor data indicative of one or more of a head pose of a user corresponding to the second user avatar, an eye gaze of the user, a hand gesture of the user, a face of the user, or a body movement of the user.

15. The non-transitory computer-readable medium of claim 13, wherein the sensor data comprises sensor data indicative of one or more of a haptic control of a user corresponding to the second user avatar, a spatial proximity of the second user avatar with respect to one or more rendered objects associated with the XR application, or an object pose of the one or more rendered objects.

16. The non-transitory computer-readable medium of claim 13, wherein the instructions further cause the one or more processors to generate an interaction score as the estimation of the unauthorized interaction, wherein the interaction score comprises a numerical value indicative of a likelihood of the unauthorized interaction with the XR application by the second user avatar.

17. The non-transitory computer-readable medium of claim 13, wherein the instructions further cause the one or more processors to execute the data obfuscation based on whether the estimation of the unauthorized interaction exceeds a predetermined threshold.

* * * * *